Oct. 19, 1965 D. B. TSCHUDY ETAL 3,212,730
FLYING INFLATABLE REENTRY DEVICE WITH LANDING
POINT CONTROL CAPABILITY
Filed April 19, 1963 4 Sheets-Sheet 3

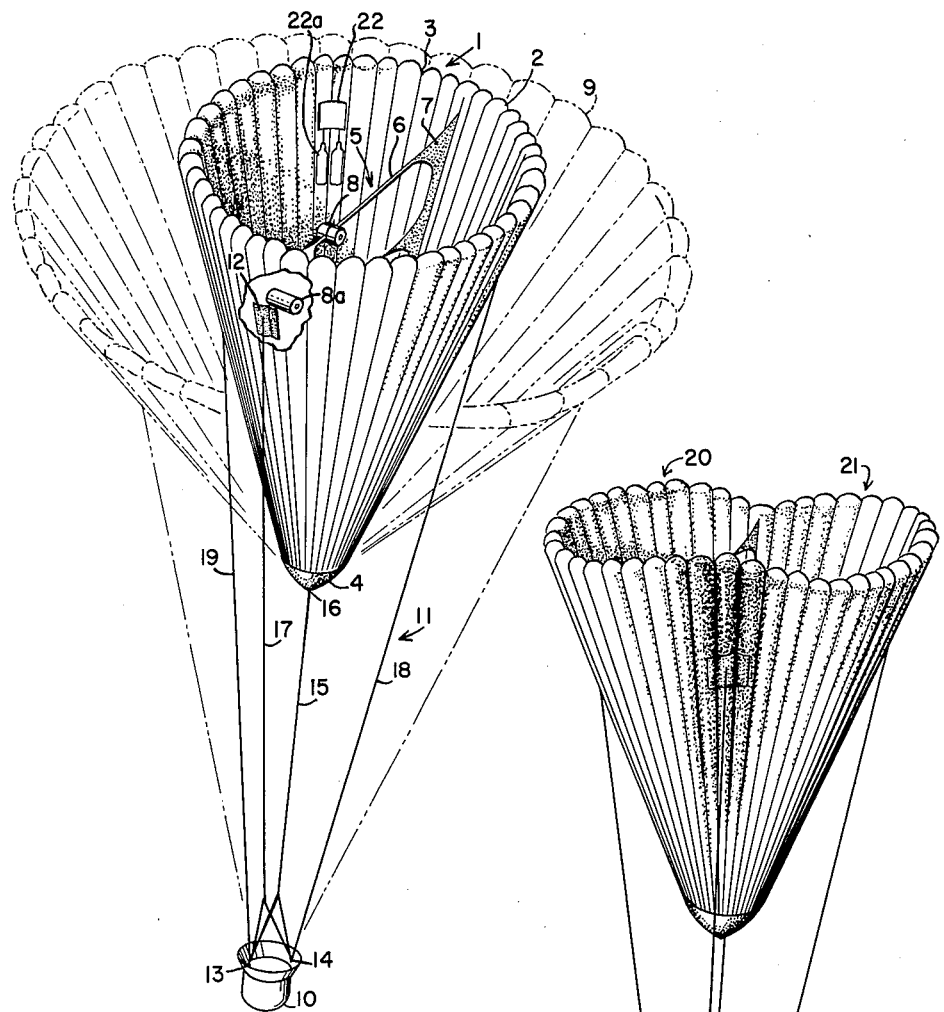

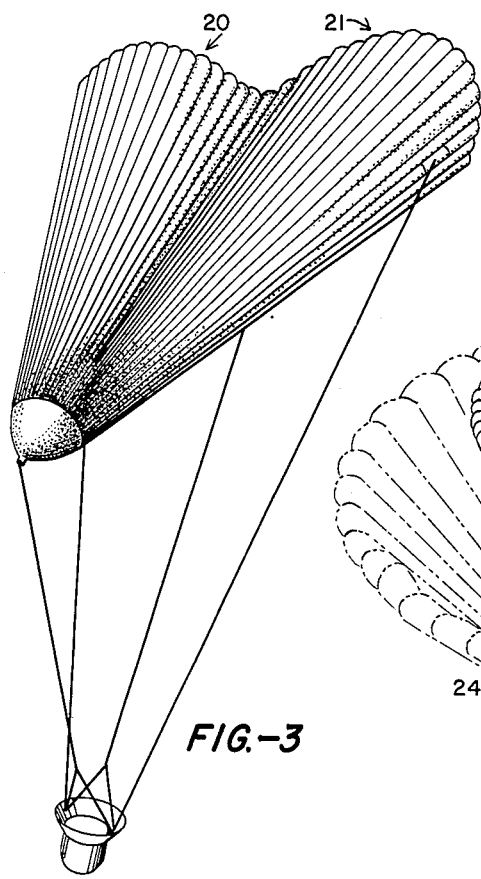
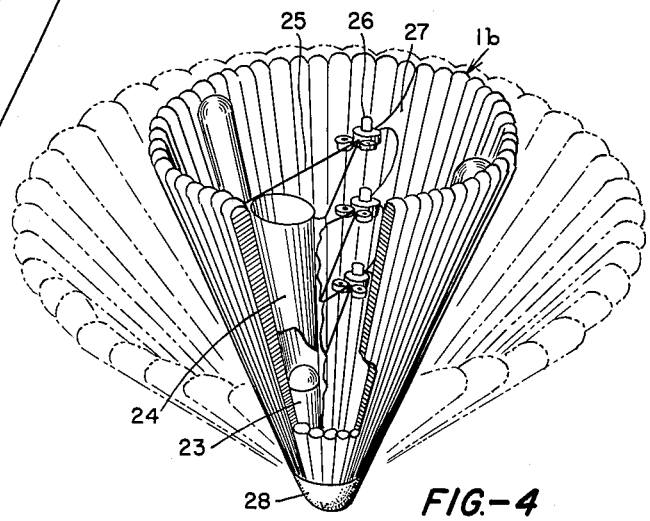
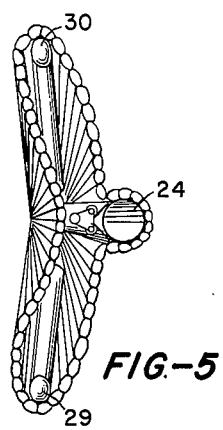
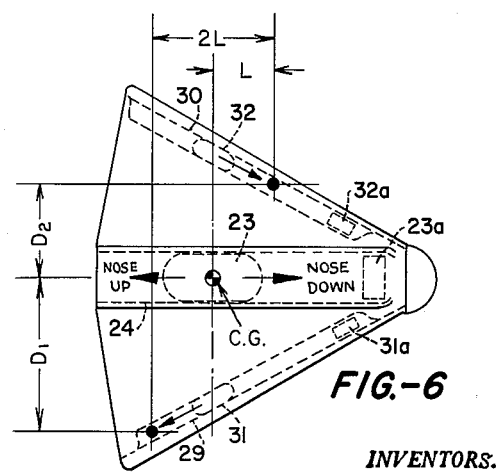

INVENTORS.
DONALD B. TSCHUDY
BY RALPH H. ERLANGER

ATTORNEY

Oct. 19, 1965 D. B. TSCHUDY ETAL 3,212,730
FLYING INFLATABLE REENTRY DEVICE WITH LANDING
POINT CONTROL CAPABILITY
Filed April 19, 1963 4 Sheets-Sheet 4

INVENTORS.
DONALD B. TSCHUDY
BY RALPH H. ERLANGER

ATTORNEY

United States Patent Office 3,212,730
Patented Oct. 19, 1965

3,212,730
FLYING INFLATABLE REENTRY DEVICE WITH LANDING POINT CONTROL CAPABILITY
Donald B. Tschudy, North Canton, and Ralph H. Erlanger, Cleveland, Ohio, assignors to Goodyear Aerospace Corporation, a corporation of Delaware
Filed Apr. 19, 1963, Ser. No. 274,134
2 Claims. (Cl. 244—1)

This invention relates to flying inflatable reentry devices with landing point capabilities, and more particularly, to controllable carrier structures that will deposit a payload at a desired location with the entire structure capable of reentering the earth's atmosphere either from an orbital relationship or an outer space relationship.

Heretofore it has been known that it is possible to return an orbiting payload from its space environment to the earth by using a heat shield with no damage to the structure of the payload. However, it has not been possible to direct the path of the returning payload after it reenters the earth's atmosphere, and consequently, it is very difficult to ascertain exactly where the payload will land on the earth's surface. At the present time, landing point capability is controlled by precise firing of retro-rockets on the space vehicle during its orbital path with such retro-rocket firing causing the payload to fall back into the earth's atmosphere with free fall characteristics and no further controlling factors determining where the payload will actually fall. Thus, if retro firing is not exactly timed or if the space vehicle is not perfectly oriented, the payload will not fall where desired.

It is the general object of the invention to avoid and overcome the foregoing and other difficulties of and objections to prior art practices by the provisions of a flying inflatable reentry device that can be controlled in flight after it reenters the earth's atmosphere so that the payload may be directed to a target landing area within any reasonable distance from the point where the device reentered the atmosphere.

Another object of the invention is to provide an inflatable reentry device which can be simply controlled by remote control or control on board to direct the payload to a desired landing area.

Another object of the invention is to provide a lightweight, durable, and inexpensive structure which is capable of controlled inflation or deflation and controlled configuration to enable the device to be controlled in gliding flight to land at any desired landing area within glidable range.

The aforesaid objects of the invention, and other objects which will become apparent as the description proceeds, are achieved by providing in a flying inflatable reentry device the combination of an adjustable payload, an adjustably inflatable lobed conically shaped structure to provide drag to slow the payload down and to glibably support the payload for directed glided flight, means to adjust the position of the payload with respect to the structure, means to adjust the shape and drag area of the structure, and a hard heat-sink or ablative type of nose structure being integrally attached to the apex of the conical structure to absorb and deflect the heat of reentry.

For a better understanding of the invention, reference should be had to the accompanying drawings, wherein:

FIGURE 1 is a perspective view of one embodiment of the invention;

FIGURE 2 is a perspective view of the embodiment shown in FIGURE 1 with the cone being partially closed and the payload being vertically below the cone;

FIGURE 3 is a perspective view of the invention of FIGURE 1 with the cone partially closed as shown in FIGURE 2 but with the payload supporting wires being adjusted so that gliding flight is achieved;

FIGURE 4 is a cut away perspective view of another embodiment of the invention;

FIGURE 5 is an end view of the device shown in FIGURE 4 with the conical structure being partially closed to provide wing type lifting surfaces;

FIGURE 6 is a plan elevation of the device of FIGURE 4 with the payload and weight masses shown by dotted lines in relation to the configuration of the device;

Figure 7:
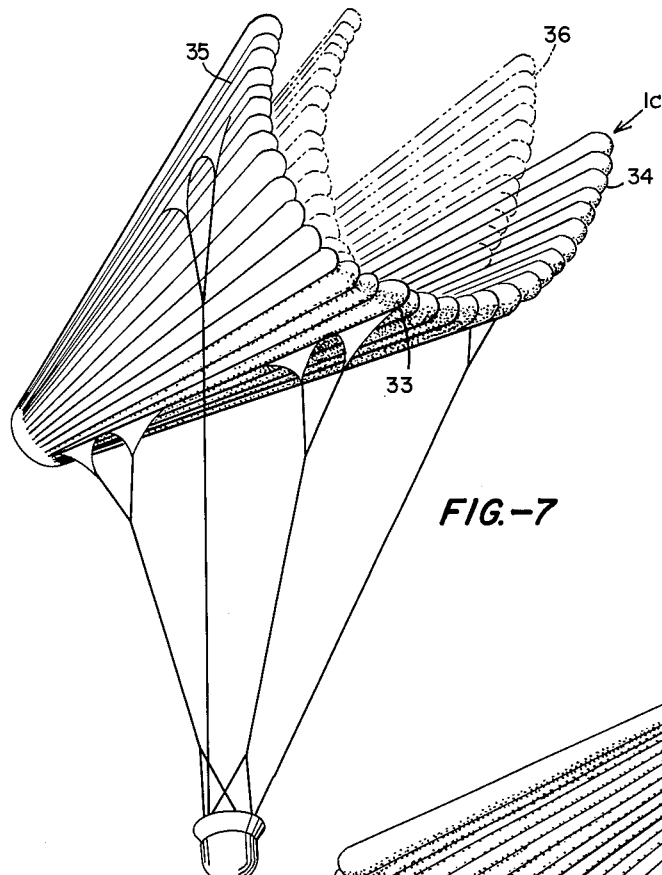
FIGURE 7 is a perspective view of another embodiment of the invention comprising only a half cone structure.

Although the principles of the invention are broadly applicable to practically any type of controlled gliding flight upon a vehicle's reentry into the atmosphere of the earth from orbial flight or space flight, the invention is usually employed in conjunction with an inflatable device which shape is controllable and hence it has been so illustrated and will be so described.

With specific reference to the form of the invention illustrated in the drawings, and particularly FIGURE 1, the numeral 1 indicates generally a conical shaped reentry device made up of a plurality of abutting, conical members 2, separated from each other by either solid fabric webs 3 or by webs 3 formed of drop threads. In order to permit the device 1 to withstand the high temperatures involved in reentry to the earth's atmosphere, a hard heat-sink or ablative type of nose structure 4 forms an integral part at the apex of the device 1. In order to flatten the cone shaped device 1 into substantially a delta shape when the device has decelerated to a specified velocity in the earth's atmosphere, an internal catenary cable system generally denoted by 5 is provided.

The system 5 contains a plurality of cables 6 connected on one side of the device 1 as by webbed shaped fabric structures 7 and to the other side as by power reels 8. The power reels 8 are such that they can be controlled to shorten or lengthen the wires 6 in complementary fashion to thereby enlarge the conical structure in conjunction with increasing the pressure in the conical members 2 to the form 9 shown by the dotted lines. Also, by shortening the cables 6, and deflating slightly the device 1 can be flattened to substantially the delta shape shown in FIGURES 2 and 3.

A payload 10 is supported by a plurality of external cables generally denoted by 11 which extend from a plurality of connecting attachments on the device to connecting attachments 13 and 14 on the payload 10. In order to provide stability and maneuverability to the device 1, the wires 11 are connected between the payload 10 and the device 1 as follows:

(1) Wire 15 extends from a Y-shaped leader attaching at 13 and 14 on the payload 10 to an attachment 16 on the nose cone 4.

(2) Wire 17 extends from a Y-attachment at points 13 and 14 on the payload 10 to attachment 12 near the top forward center of the device 1.

(3) Wire 18 extends from attachment 14 on the payload 10 to an attachment on device 1, similarly placed, but displaced 90° circumferentially counterclockwise from the attachment 12 for wire 17.

(4) Wire 19 extends from attachment 13 on the payload 10 to an attachment on the device 1, which is also similarly placed, but displaced 90° circumferentially clockwise from the attachment 12 for wire 17.

It is noted that wires 18 and 19 are spaced approximately 180° circumferentially of the device 1 in relation to each other. With the payload 10 properly supported by the cables 11, the attachments 13 and 14 thereon are located substantially in the same plane as the attachments on the device 1 for the wires 18 and 19. The payload suspension cables 11 are connected to power reels (of which the reel 8a for wire 19 is typical) inside the device 1 which power reels can shorten or lengthen the cables 11 as necessary.

With respect to the change of shape of the body, as from dotted lines to solid lines in FIGURE 1, it should first be understood that with the body at rest and/or with pressure equal on the inside and outside of the body, the inflation of the body always results in the same free inflation shape to which the body is cut and assembled. This is the dotted line shape for a particular cut and assembly, and the dotted line shape results regardless of the amount of inflation pressure. But when the body of dotted line shape is towed by the nose 4, for example, to make reentry of the body into the earth's atmosphere, there is a greater pressure on the outside of the conical body than on the inside causing it to move from the dotted position towards the solid line position. As the body slows down the shape changes back towards the dotted line from the solid line shape. The higher the inflation pressure the less movement of the body from the dotted line to the solid line and back to the dotted line. Thus, the reentry shape is dependent on the external atmospheric pressure on the body caused by reentry in conjunction with the internal pressure inside the body. Internal pressure could be controlled by a valve system 22 in combination with a system of gas bottles or cylinders 22a carried in the body.

Usually after deceleration to a specified velocity in denser air, the shape of the cone is altered by driving the power driven reels 8 so as to produce the two large lobes 20 and 21 indicated in FIGURE 2. Simultaneous with this maneuver, the payload suspension cables 11 are adjusted, so as to produce a rearward shift of the center of gravity by moving the payload 28 to the rear as shown in FIGURE 3. The two lobes 20 and 21 of the cone assume the function of lifting surfaces. Pitch control of this embodiment is accomplished by appropriate lengthening and shortening of the fore and aft suspension cables 15 and 17 while roll control is produced by adjustment of the lateral cables 18 and 19. No provision is made for direct yaw control, but the combination of fore and aft and lateral center of gravity shift should provide sufficient control of the vehicle to enable it to be flown to a desired destination within the limits of its gliding range.

FIGURE 4 shows a reentry device 1b substantially like that described in FIGURES 1 to 3. However, it differs from the former primarily in carrying its payload 23 internally as by duct 24. The payload 23 may be moved in duct 24 to control pitch by a suitable power cable means 23a, or other appropriate means. This system thereby avoids the heating and drag problems incurred by the use of exposed cables, attachments and payload as described in FIGURES 1 to 3.

In order to alter the shape of the device 1b a plurality of V-shaped catenary type wires 25 are positioned from each side of the duct 24 to power reels 26, which reels are supported by fabric webs 27. Again, a heat-sink or ablative type of nose cone 28 is provided. In order to control the roll and yaw characteristics of the device in gliding flight, roll mass ducts 29 and 30, as best seen in FIGURES 5 and 6, are provided on diametrically opposite sides of the device 1b displaced approximately 90° circumferentially from the payload transfer duct 24. These ducts 29 and 30, which are diametrically smaller than the duct 24, contain movable weights 31 and 32 respectively, which are controllable by appropriate power cable means 31a and 32a, or other suitable means in the same manner that the payload 23 can be controlled.

In operation, external pressure change to the outside of the conical body in conjunction with internal pressure change, would be utilized, as before, to vary the cone drag area for reentry. The shifting of the payload 23 fore or aft in the payload transfer duct 24 effects control of the device 1b in pitch while the complementary shifting of the weights 31 and 32 in roll mass ducts 29 and 30 effects control of the device 1b in roll. By shifting the weights 31 and 32 an equal distance in opposite directions, no change in longitudinal center of gravity position would be created, but a net change in lateral balance would be effected, because the rearward mass, being farther from the longitudinal center of duct 24, would produce a larger moment about the vehicle's longitudinal axis than the forward moving mass.

Also, a method of roll and yaw control might be effected by differential pressurization of the lifting lobes which would require positive compartmentization of the vehicle. The side under lower internal pressure would have a smaller net effective lobe area, and thus would experience a smaller upward deflection due to the effect of lift, and the differential lift thus created would produce a rolling moment around the longitudinal axis of the device with a resultant yaw in the direction of roll.

Figure 8:
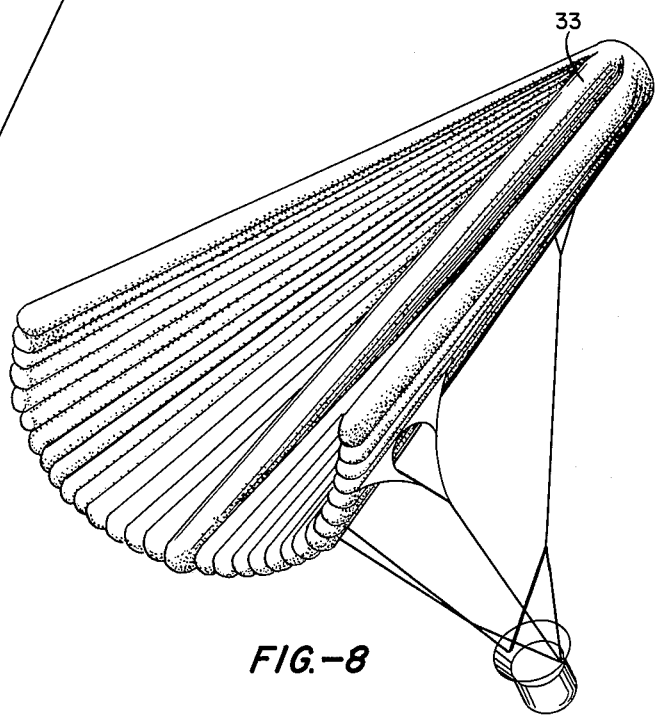
FIGURE 8 is a perspective view of the device of FIGURE 7 shown in gliding flight.

With reference to FIGURES 7 and 8, another approach along the same general ideas previously described visualizes a triangular shaped or half conical shaped device 1c. Again, it is constructed of a series of conical shaped individual lobes joined in the same manner as described for the device 1 of FIGURE 1. In addition it is thought that a single, larger tube 33, in the center, tapered with small diameter located aft might serve as a stiff keel to which the rest of the vehicle would be attached.

The payload is suspended from the keel member 33 and from the outward sides of the lobes 34 and 35, in such a manner that the configuration of the device 1c would always remain concave upward irrespective of aerodynamic loads or payload suspension loads imposed upon it. In operation, atmospheric reentry, illustrated in FIGURE 7, would be accomplished by shifting the system's center of gravity through suspension cable arrangement, previously described for the device 1 shown in FIGURE 1, so that a parachute-like decent would occur. Drag area, as in the previously described configurations, would vary dependent on the external pressure on the device during reentry in combination with internal pressure change. The dotted outline 36 in FIGURE 7 indicates possible changes of configuration to vary drag area. Internal pressure source as in the previous systems could be a valve system in combination with gas bottles or cylinders placed in the keel member 33.

Conversion from reentry into flying configuration would be effected by shifting the payload forward through cable adjustment, as shown in FIGURE 8, thus dropping the nose until forward motion is obtained. Variation in pitch attitude and flight path will be obtained by further shifting of the position of the center of gravity by adjusting the suspension cables as described for the device of FIGURE 1.

Figure 9:
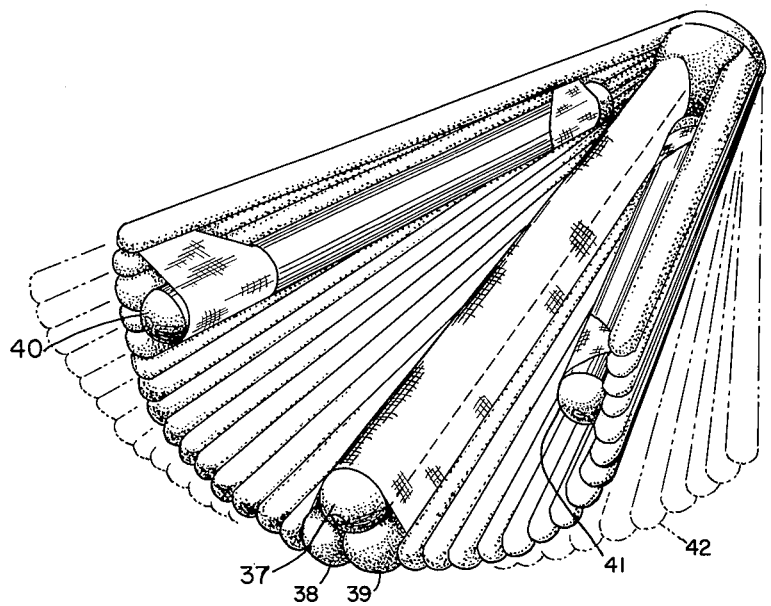
FIGURE 9 is a perspective view of another embodiment of the device shown in FIGURE 7 with the payload carried directly in the half conical structure.
Figure 10:
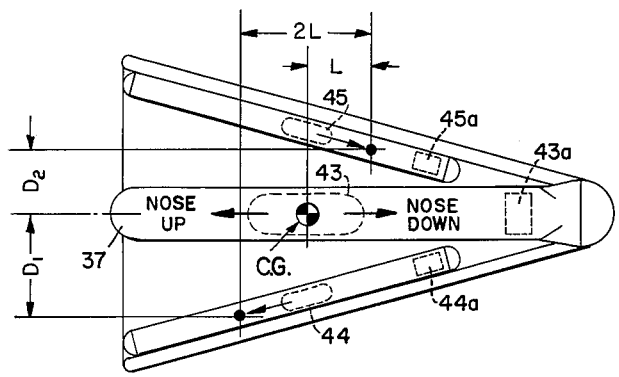
FIGURE 10 is a plan elevation of the device of FIGURE 9 with the payload and weight masses shown by dotted lines in relation to the configuration of the structure.

The concept illustrated in FIGURES 9 and 10 combine the half cone triangular shape of FIGURES 7 and 8 with the internally carried payload concept and control method of FIGURES 4, 5, and 6. A flexible stiffened duct 37 serving as payload container and guide is attached to and supported between two large tubular keel members 38 and 39. Two small duct-like tubes 40 and 41, one near each of the two leading edges, again would serve as guides for a double system of masses for the purpose of controlling roll.

Parachute-like reentry position would be similar to that shown in FIGURE 7, with the payload in the position somewhere about ⅔ back from the nose along the keel axis. Adjustment of the payload for vehicle stability during this phase would have to be a function of effective drag area which is again made variable dependent on the external pressure of reentry in combination with internal pressure change and is indicated by the dotted outline 42. Again, as previously described in FIGURE 6 the payload 43 would move longitudinally back and forth in the payload duct 37 by appropriate power cable means 43a, or other appropriate means, to effect control in pitch, while the leading edge masses 44 and 45 would be moved in equal and opposite directions by suitable power cable means 44a and 45a, or other appropriate means, to effect roll stability.

Conversion to forward flight after reentry deceleration is accomplished by shifting payload and roll control masses forward to a point approximately ⅓ to ½ of the way back of the nose, depending on the vehicle geometry.

Thus, even though various forms of the idea have been described it should be recognized that the basic form of the invention visualizes a reentry vehicle capable of controlled flight after reentry utilizing a conical shape which can be flattened or closed to a delta shape to provide lifting lobes or wings, and which is controlled by varying the shape of the wings by increasing or decreasing pressure therein, and by shifting the weight mass of the payload to effect pitch and roll control, and in some instances shifting small weights on the edges of the lobe to effect roll stability. It will be realized that in this very simple yet effective manner a reentry vehicle can have a directed glide path to land it at a designated area within its gliding range, and which device is characterized by simplicity of construction, ease of operation, relatively low cost, and great advantages over the reentry devices presently used.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a glide controllable reentry device the combination of a half-conically shaped structure, a plurality of small conically shaped members comprising the structure, said members being connected at their adjacent edges by a solid fabric web, a payload transfer duct formed as an integral part of the structure and substantially forming a keel down the longitudinal center line of the structure, a payload housed in the transfer duct and being controllably slidably therein, two roll mass ducts being formed integral with the structure running longitudinal of the structure but being on the outer edges thereof, a weight being controllably and slidably positioned in each duct, means to control the inflation or deflation of the conically shaped members to thereby control the drag area of the structure, and means to control the position of the payload and roll weights in relation to the structure to effect roll and pitch control in gliding flight under atmospheric conditions.

2. In a reentry device the combination of a substantially triangularly shaped structure, a plurality of small conically shaped members comprising the structure, a payload transfer duct formed as an integral part of the structure, a payload housed in the transfer duct, two roll mass ducts being formed integral with the structure on the edges thereof, a weight being positioned in each roll mass duct, means to control the inflation or deflation of the conically shaped members, and means to control the position of the payload and roll mass weights in relation to the structure.

References Cited by the Examiner

UNITED STATES PATENTS

| | | | |
|---|---|---|---|
| 1,840,618 | 1/32 | Castner | 244—146 |
| 2,761,636 | 9/56 | Finlay | 244—113 |

OTHER REFERENCES

Interavia, page 1520, November 1961.
Aviation Week (1), page 32, October 8, 1962.
Aviation Week (2), pages 52, 53, Feb. 4, 1963.

FERGUS S. MIDDLETON, *Primary Examiner.*